Figure 1:
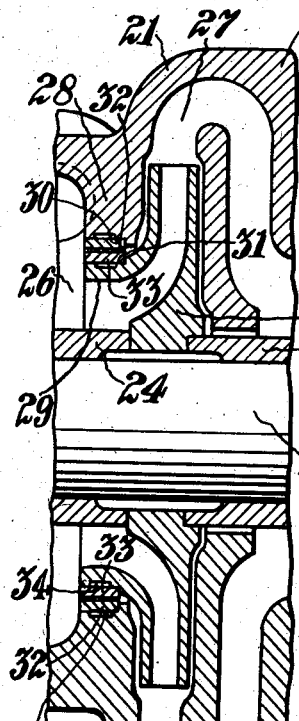

Dec. 20, 1938. A. L. McHUGH 2,140,644
LOCKING DEVICE
Filed May 24, 1937

INVENTOR
Anthony L. McHugh
BY
HIS ATTORNEY.

Patented Dec. 20, 1938

2,140,644

UNITED STATES PATENT OFFICE 2,140,644

LOCKING DEVICE

Anthony L. McHugh, Easton, Pa., assignor to Ingersoll-Rand Company, Jersey City, N. J., a corporation of New Jersey Application May 24, 1937, Serial No. 144,402

3 Claims. (Cl. 287—53)

This invention relates to centrifugal pumps, and more particularly to a locking device for securing together concentrically arranged elements of pumps of this type.

The invention is intended more particularly for locking in position the ring elements relied upon for controlling leakage along the hub of a pump impeller.

The use of elements of this character for the purpose stated is common in centrifugal pumps, it being customary to dispose one ring on the hub of the impeller and another in the diaphragm dividing the inlet chamber from that into which the impeller discharges. The confronting surfaces of the rings are closely spaced so that only a thin film of liquid normally exists therebetween and in this way leakage from the zone of superior pressure into the inlet chamber will be minimized.

It is impractical to hold the clearance between the rings to very close limits because of certain unfavorable conditions incident to the operation of the pump. One example is that of vibration of the rotary elements during the accelerating periods of the pump. During such times, unless adequate clearance is provided, the vibratory movement of the shaft may carry the impeller ring against the stationary ring and cause damage and wear of such extent on the rings as to seriously lower the efficiency of the pump.

With liquid passing between the confronting surfaces of the ring the abrasive action of entrained solids will also increase the clearance between the rings, and when the surfaces become worn beyond the permissible limit the rings are replaced and in that way the initial efficiency of the pump is restored. The frequency of replacements depends, of course, upon the character of the liquid being pumped, but the time required to make the substitution often interferes seriously with the operation of the system of which the pump forms a part. It is, therefore, essential that the pump be so constructed as to enable the rings to be quickly and easily installed and removed.

Various schemes have been proposed, heretofore, for securing the rings in position. One of these is to thread the rings to the parts carrying them. Initially, this arrangement may prove satisfactory. However, when replacements are made the threads of the various parts involved often do not screw up truly and the rings may, therefore, lie eccentrically with respect to each other with the result that an excessive amount of liquid will leak from the discharge chamber to the inlet chamber.

Other expedients employed for fastening the rings in position are set screws and spot-welding the rings to the adjacent elements. While these schemes have been employed with some degree of success they are, however, open to certain practical objections. In the case of screws used in connection with hardened parts the screws readily become marred and usually to such an extent that it is extremely difficult to effect their removal, and the operation of removing a ring that is spot-welded to the impeller requires appliances and a degree of skill that are frequently not readily available.

In view of the foregoing considerations it is contemplated to expedite and simplify the operation of removing and attaching the wearing rings from and to a centrifugal pump.

Another object is to eliminate the use of special appliances for securing the wearing rings in position.

A further object is to enable the initial efficiency of the pump to be readily and conveniently restored.

Other objects will be in part obvious and in part pointed out hereinafter.

Figure 2:
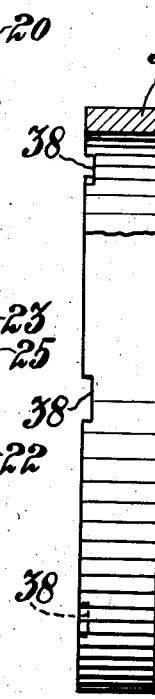
Figures 3, 4:
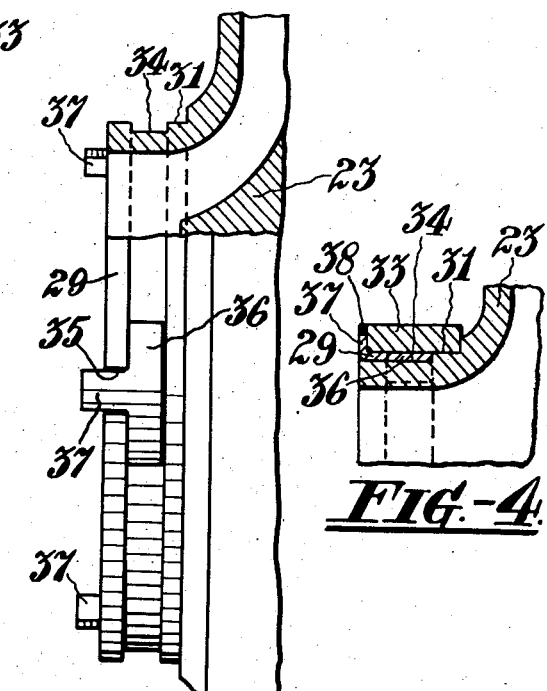
Figure 7:
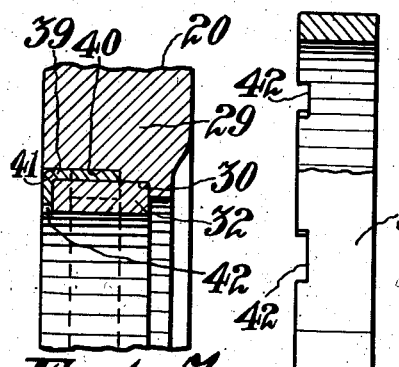
Figures 5, 6:
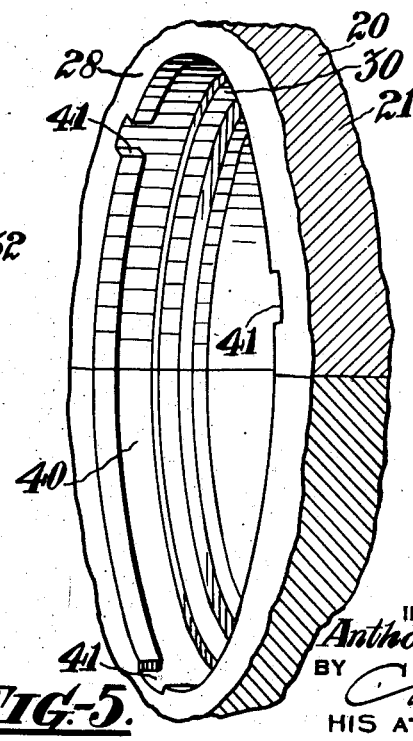

In the drawing accompanying this specification and in which similar reference numerals refer to similar parts, Figure 1 is a longitudinal elevation, in section, of so much of a pump as will serve to illustrate a practical application of the invention, Figure 2 is a side elevation, partly in section, of an impeller ring constructed to accommodate the locking device, Figure 3 is a similar view of the impeller and showing a series of locking devices or keys arranged in its hub, Figure 4 is an elevation, in section, showing the impeller ring in assembled position on the impeller hub and secured thereto by the locking device, Figure 5 is a perspective view of a casing part constructed to accommodate the locking device, Figure 6 is a view similar to Figure 2 showing the wearing ring intended to be applied to the casing part shown in Figure 5, and Figure 7 is a view similar to Figure 4 showing a wearing ring in position in the casing and secured thereto by the locking device.

Referring to the drawing 20 designates, in general, a pump comprising a casing 21 through which extends a shaft 22. The shaft may be provided with suitable bearings (not shown) and carries an impeller 23 which is held against endwise movement with respect to the shaft by sleeves 24 and 25.

The casing 20 is suitably recessed to provide inlet and discharge chambers 26 and 27, respectively, for the impeller and said chambers are divided by an introverted wall 28, in the casing, lying in substantially the same transverse plane as the hub 29 of the impeller 23.

The confronting surfaces of the wall 28 and the hub 29 are concentric with each other and are provided with superficial grooves 30 and 31, respectively, to accommodate wearing rings 32 and 33 which may be press fitted to the parts they engage.

In accordance with the practice of the invention, the hub 29 of the impeller is provided with an external annular groove 34 and a series of slots 35 of the same depth as the groove and extending from the groove to the free end of the hub 29. Within the groove 34 and the slots 35 are arranged key members 36 of T-shape of which the stem 37 lies in a slot 35 and extends exteriorly of the hub 29.

The key members, of which three are shown for the sake of illustration, are constructed of bendable material and the free ends of the stems 37 are accordingly bent at an angle to the remaining portion of the stem 37 and, in the assembled positions of the parts, lie within notches 38 in the outer end of the ring 33.

In thickness, the key members 36 preferably equal substantially the depth of the groove 34 and the slots 35 so that when the ring 33 is positioned on the hub 29, in which it overlies the groove and the slots, the key members will be restrained against movement other than that permitted by such slight clearances as may exist between the edges of the key members and the walls defining the spaces wherein they are arranged.

The key members 39 employed for securing the ring 32 to the wall 28 are preferably replicas of the key members 36, and the inner or peripheral surface of the wall 28 is suitably constructed for their accommodation. The wall 28 is accordingly provided with an annular groove 40 to receive the cross bars of the key members and slots 41 extending from the outer end of the wall and the groove 40 to accommodate the bar portions of the key members of which the free ends are bent into notches 42 in the outermost end of the ring 32.

In practice, whenever the rings 32 and 33 become worn or otherwise unfit for service and, it is desired to replace them the incurvate portions of the key members lying in the notches 38 and 42 are bent into coincidence with the portions lying in the slots 35 and 41. The rings may then be removed from the impeller hub and the wall 28. After new rings have been replaced on these elements the free ends of the bar portions of the keys are again bent into engagement with the notches in the ends of the rings and will thereby serve to hold the rings against both axial and rotary movement with respect to the members carrying them.

The present invention has been found to be a highly desirable device for locking an impeller ring and the associated stationary ring in position. The key members may be quickly and easliy bent into interlocking engagement with the rings and released therefrom with equal facility and without necessitating the use of special appliances.

A further highly desirable advantage of the present invention is that repeated substitutions of rings may be made without marring or injuring any of the parts relied upon to maintain an adequate seal between the inlet and discharge chambers and the initial clearances between the sealing rings may, therefore, be repeatedly duplicated so that the original efficiency of the pump may be maintained at all times.

I claim:

1. In combination, a pump having a pair of members in telescopic engagement with each other, one of said members having a slot comprising portions of the same depth arranged in angular relationship and the other member having a notch, and means lying in the several portions of the slot of a thickness equaling the depth of the slot interlocked with the wall thereof and having a portion extending into the notch to prevent relative axial and rotary movement between the members.

2. In combination, a pump having a pair of telescopically arranged members, one of said members having a T-shaped slot of uniform depth in its surface and the other member having a radial notch, and a T-shaped key in the slot having a transverse portion extending into the notch to prevent relative axial and rotary movement between the members.

3. In combination, a pump having a pair of telescopically arranged members, one of said members having a slot in its peripheral surface comprising portions of equal depth arranged in angular relationship and the other member having a radial notch, and a locking member in and of a thickness equaling the depth of the slot interlocked with the wall thereof and extending into the notch to prevent relative axial and rotary movement between the members.

ANTHONY L. McHUGH.